(12) United States Patent
Halberstadt et al.

(10) Patent No.: US 7,391,627 B2
(45) Date of Patent: Jun. 24, 2008

(54) POWER CONVERTER

(75) Inventors: Johan Christiaan Halberstadt, Nijmegen (NL); Gerrit Van Der Horn, Delft (NL)

(73) Assignee: NXP B.V., Eindhoven (NL)

( * ) Notice: Subject to any disclaimer, the term of this patent is extended or adjusted under 35 U.S.C. 154(b) by 602 days.

(21) Appl. No.: 10/516,725

(22) PCT Filed: May 21, 2003

(86) PCT No.: PCT/IB03/02250

§ 371 (c)(1),
(2), (4) Date: Dec. 1, 2004

(87) PCT Pub. No.: WO03/103122

PCT Pub. Date: Dec. 11, 2003

(65) Prior Publication Data

US 2005/0207181 A1    Sep. 22, 2005

(30) Foreign Application Priority Data

Jun. 4, 2002    (EP)    ................................. 02077196

(51) Int. Cl.
*H02M 3/335* (2006.01)

(52) U.S. Cl. .................... 363/16; 363/18; 363/21.17; 323/222; 323/282; 323/284; 323/285; 323/266

(58) Field of Classification Search .................. 363/16, 363/18, 21.17; 323/222, 282, 284, 285, 266, 323/299

See application file for complete search history.

(56) References Cited

U.S. PATENT DOCUMENTS

| | | | | |
|---|---|---|---|---|
| 4,837,495 A | * | 6/1989 | Zansky | 323/222 |
| 5,003,454 A | * | 3/1991 | Bruning | 363/81 |
| 5,999,421 A | * | 12/1999 | Liu | 363/21.15 |
| 6,061,258 A | * | 5/2000 | Galbiati et al. | 363/98 |
| 6,069,807 A | * | 5/2000 | Boylan et al. | 363/97 |
| 6,178,104 B1 | * | 1/2001 | Choi | 363/89 |

* cited by examiner

*Primary Examiner*—Bao Q. Vu
*Assistant Examiner*—Nguyen Tran
(74) *Attorney, Agent, or Firm*—Peter Zawilski

(57) ABSTRACT

A power converter comprises an inductor (LP) and a controllable switch (CF) coupled to the inductor. A switch controller (1) supplies a periodic switching signal (VC1) which has a repetition time and a duty cycle to the controllable switch (CF) to generate a periodical inductor current (IL) through the inductor. A generator (2) generates an emulated signal (IE) based on timing information (TI) which represents the repetition time and the duty cycle to emulate a current signal being representative of the inductor current. A comparator (3) compares the emulated signal (IE) with the current signal (CS) to obtain an error signal (E). A generator controller (4) receives the error signal (E) to supply a control signal (VD) to the generator (2) to adapt a property of the emulated signal (IE) to become substantially equal to a property of the current signal (CS).

12 Claims, 6 Drawing Sheets

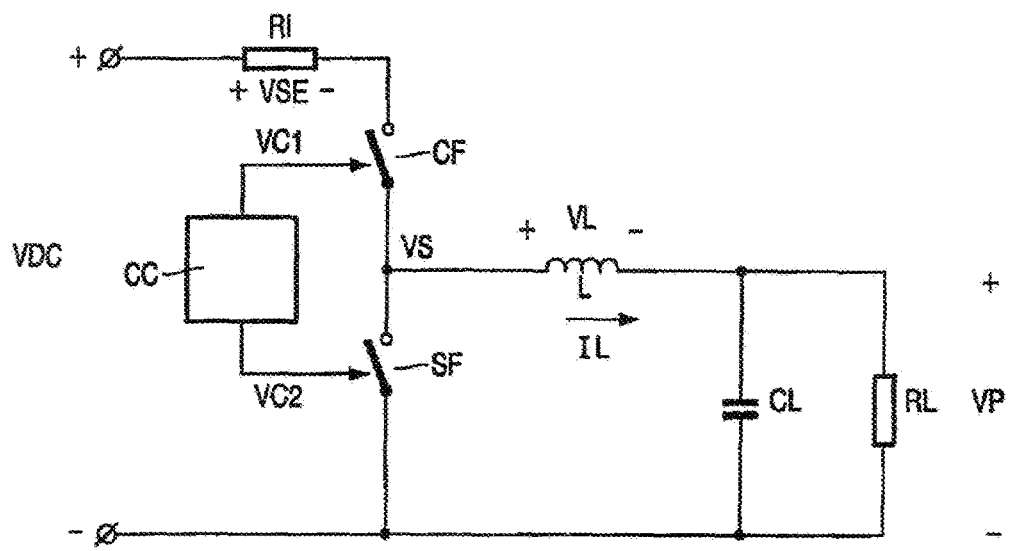
FIG. 1
(Prior Art)
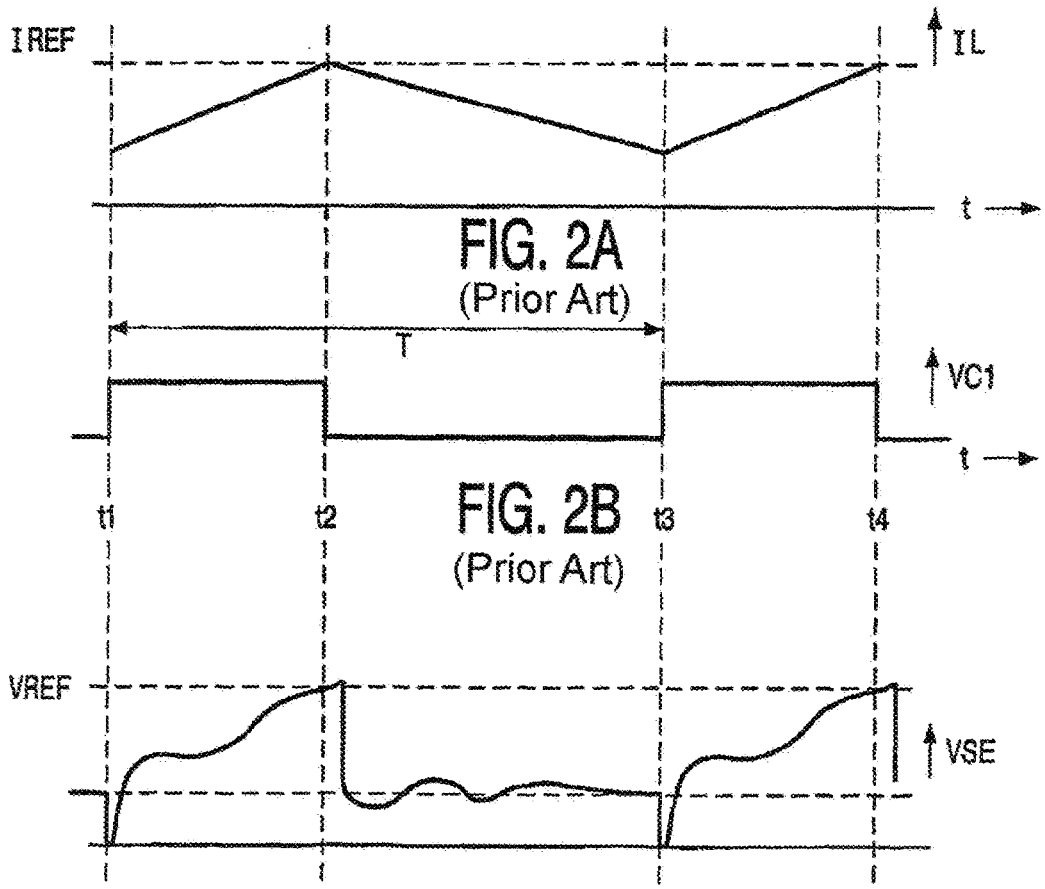
FIG. 2A
(Prior Art)
FIG. 2B
(Prior Art)
FIG. 2C
(Prior Art)

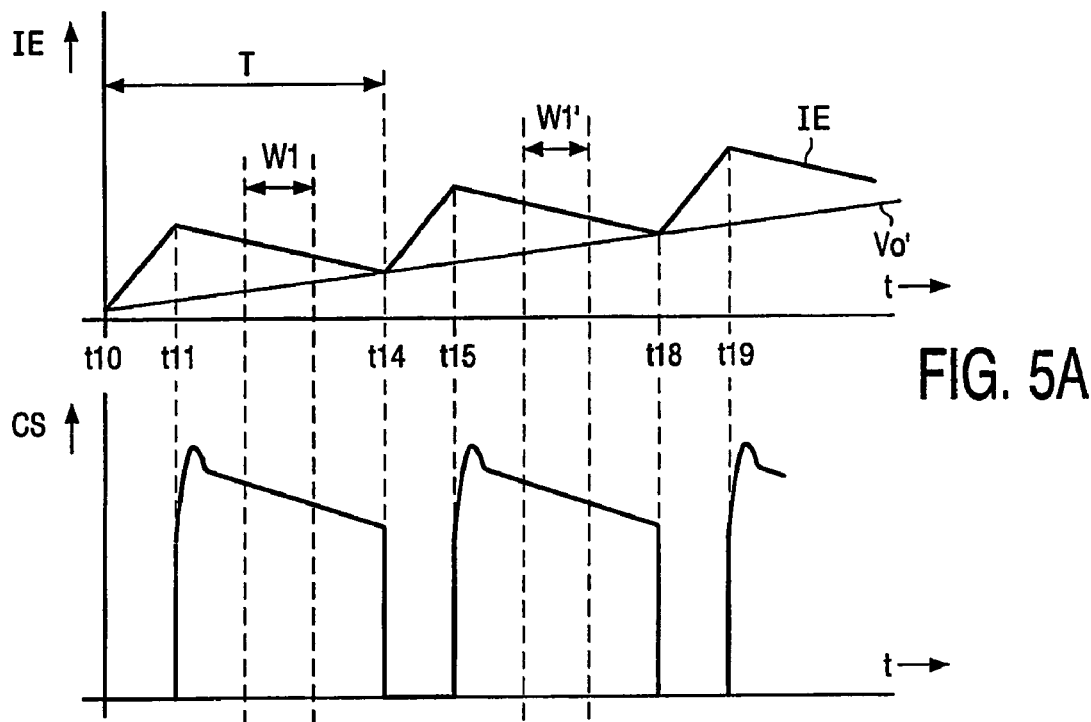
FIG. 5A
FIG. 5B
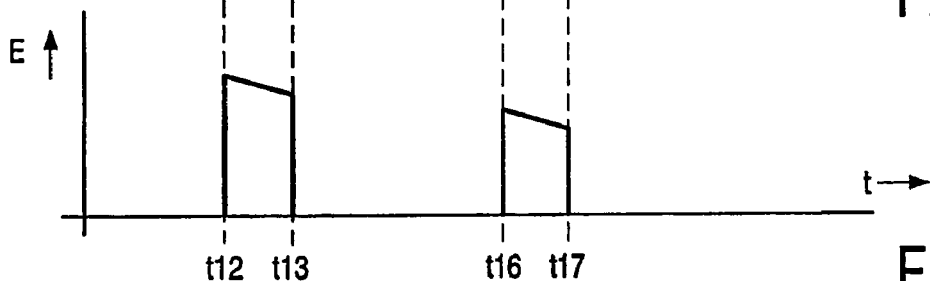
FIG. 5C

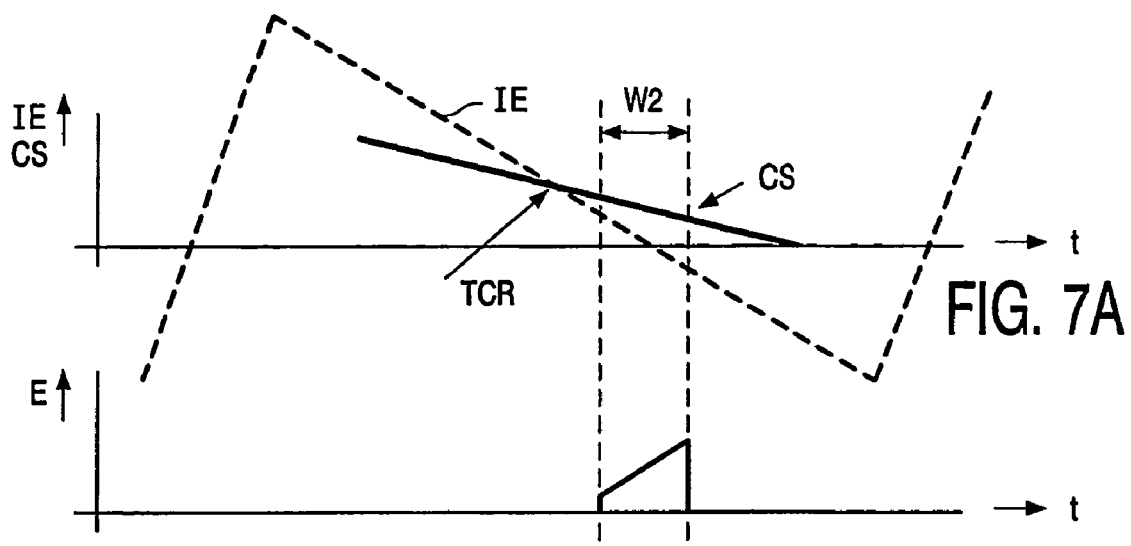
FIG. 7A
FIG. 7B
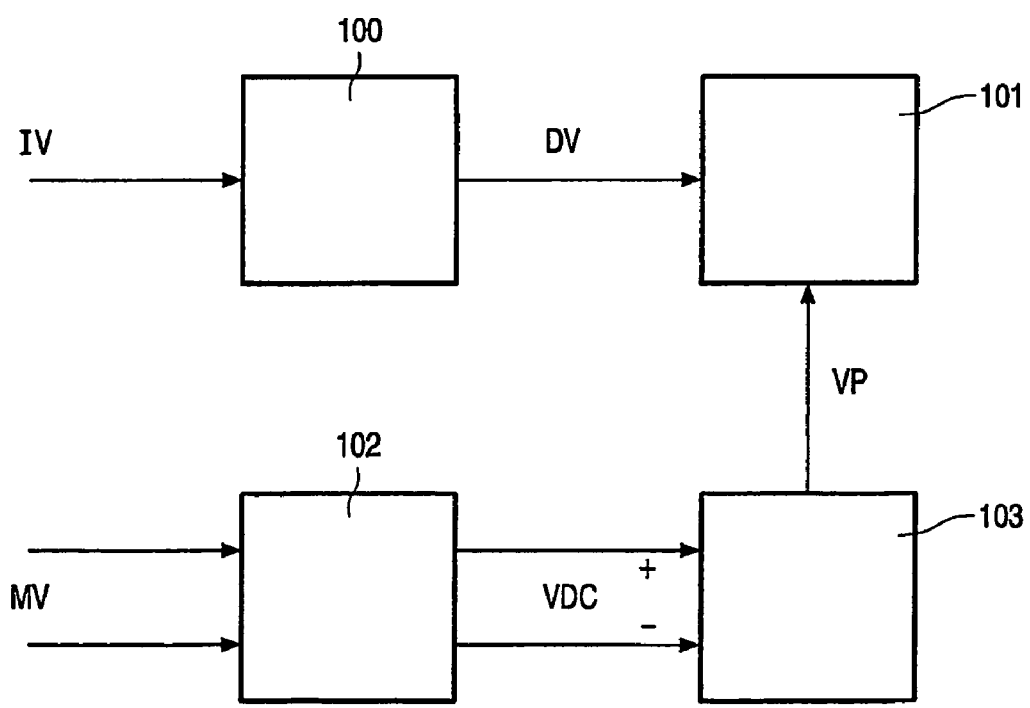
FIG. 11

POWER CONVERTER

The invention relates to a power converter and to a multi-phase buck-converter.

A prior art buck converter comprises a series arrangement of a resistor and controllable switches. The series arrangement is arranged to receive a DC-input voltage. A junction of the switches is connected via an inductor to a load, and a smoothing capacitor is arranged in parallel with the load. A control circuit controls the on- and off-periods of the switches. The switches are controlled by the control circuit such that always only one of the switches is conductive.

When the first one of the switches is closed to connect the inductor to the positive pole of the DC-input voltage, the current through the inductor increases linearly. When the current through the inductor crosses a reference level the controller opens the first switch and closes the other switch causing the current through the inductor to decrease linearly. The increasing current through the inductor is measured as a voltage across the resistor which is arranged in series with the first mentioned switch. Due to parasitic effects it takes some time until the voltage across the resistor is a good representation of the current through the inductor.

The buck converter is controlled to stabilize its output voltage by the instant the first switch is switched off.

It is a drawback of the prior art buck converter that for small values of the duty cycle, the control of the switch-off instant is disturbed by irregularities in the measured current.

It is an object of the invention to provide a power converter which provides an improved operation at small values of the duty cycle.

A first aspect of the invention provides a power converter as claimed in claim 1. A second aspect of the invention provides a multi-phase buck-converter as defined in claim 12. Advantageous embodiments are defined in the dependent claims.

The power converter comprises an inductor and a controllable switch coupled to the inductor. A switch controller supplies a periodic switching signal which has a repetition time and a duty cycle to the controllable switch to generate a periodical inductor current through the inductor. A generator generates an emulated signal based on timing information which represents the repetition time and the duty cycle to emulate the current signal being representative of the inductor current. A comparator compares the emulated signal with the current signal to obtain an error signal. A generator controller receives the error signal to supply a control signal to the generator to adapt a property of the emulated signal to become substantially equal to a property of the current signal. For example, the property may be a DC-level or an amplitude of the emulated signal, or both.

Thus, the power converter comprises a feedback loop which compares a property of the emulated signal with the same property of the current signal. The generator of the emulated signal is controlled by the difference in the property of the emulated signal and the current signal until this difference is zero or very small. As the generator controller processes the error signal, the emulated signal is a better representation of the current through the inductor than the disturbed current signal itself.

It is possible to generate an accurate copy of the inductor current including transients without measuring the voltage across the inductor, or knowing the value of the inductor. With this accurate copy of the inductor current it is possible to accurately control the conduction time of the switch of a buck power converter.

In accordance with the second aspect of the invention, a multi-phase buck-converter is used to supply large currents to a load at a well stabilized voltage across the load. For example, the load may be a microprocessor-core which requires a high current at a low voltage which is well stabilized. Such multi-phase converters comprise a multiple number of buck-converters which are arranged in parallel to supply current to the same load. To minimize the ripple on the voltage supplied, the switching phases of the buck-converters are shifted in time with respect to each other. In such a multi-phase buck-converter, it is no longer possible to use one sense resistor on the position known in the prior art (see R1 in FIG. 1), because the current in the sense resistor would be the sum of several inductor currents. In this situation, the current in the control-FET (CF in the Figures) of each of the buck-converters may be measured with a sense-FET that may be incorporated in the control-FET in a known manner. However, at a large ratio between the voltage at the input (VDC in the Figures) of the multi-phase buck-converter and the output voltage across the load, a small duty-cycle $\delta$ occurs. Further, to minimize the value of the smoothing capacitor arranged in parallel with the load, there is a tendency to increase the operating frequency of the buck-converter. The small duty-cycle $\delta$ and the high frequency cause the on-time of the control-FET to be very small. Parasitic effects will disturb the current sensed by the sense-FETs. Consequently, the current measured by the sense-FET will be an inaccurate copy of the actual current flowing in the inductor L.

In an embodiment as defined in claim 2, the emulated signal is obtained by integrating the difference of a square wave signal and a DC-level, or by integrating the multiplication of the square wave signal and a DC-level. The square wave signal has the same repetition frequency and duty cycle as the current through the inductor. Such a square wave signal can be generated in many ways. For example, the switching signal of the switch may be used. The DC-level is generated by the generator controller from the error signal. Due to the feedback, a correct emulated signal will be generated even when the DC-level or the amplitude of the square wave signal has tolerances or is not determined.

In an embodiment as defined in claim 3, the generator controller comprises a low-pass filter which will decrease the influence of the disturbances in the current signal.

In an embodiment as defined in claim 4, the power converter comprises a window generator which generates a window in time. The error is generated or is relevant only during the window, which will decrease the influence of the disturbances in the current signal present outside the window. Therefore, preferably, the window should be selected such that all or the majority of the disturbances do substantially not occur within the window.

In an embodiment as defined in claim 6, the window in time is generated by activating the comparator during the window only.

In an embodiment as defined in claim 7, the generator comprises an adder to subtract the DC-level which is generated by the generator controller from the square wave signal. The emulated signal is obtained by integrating the difference of the square wave signal and the DC-level. This embodiment prevents that the DC-level of the emulated signal drifts away. Thus, a correct emulated signal will be generated even when the DC-level of the square wave signal has tolerances or is not predetermined.

In an embodiment as defined in claim 8, the generator comprises a multiplier to multiply the DC-level which is generated by the generator controller with the square wave signal. The emulated signal is obtained by integrating the multiplication of the multiplication of the square wave signal and the DC-level. This embodiment prevents that the amplitude of the emulated signal drifts away. Thus, a correct emulated signal will be generated even when the amplitude of the square wave signal has tolerances or is not predetermined.

In an embodiment as defined in claim 9, the subtraction of the DC-level as claimed in claim 7 and the multiplication with the DC-level as claimed in claim 8 are combined. Each loop has its own comparator, window generator, and filter. This allows optimizing the windows and filters of each one of the loops.

In an embodiment as defined in claim 10, the power converter further comprises a current measuring element which is arranged to measure a current through the inductor during a period in time when the controllable switch is non-conductive. For example, the current measuring element is a resistor, a sense FET, or a current transformer. The current measuring element may be arranged in series with the inductor, or in series with a further controllable switch or a diode which conducts the current through the inductor when the first mentioned controllable switch is non-conductive.

These and other aspects of the invention are apparent from and will be elucidated with reference to the embodiments described hereinafter.

BRIEF DESCRIPTION OF THE DRAWINGS

In the drawings:

FIG. 1 shows a prior art buck converter,

FIGS. 2A-2C show waveforms for elucidating the operation of the prior art buck converter, FIGS. 5A-5C show waveforms for elucidating the embodiment of the emulator circuit shown in FIG. 4, FIGS. 7A-7B show waveforms for elucidating the embodiment of the emulator circuit shown in FIG. 6, FIG. 11 shows an electronic apparatus comprising an embodiment of a power converter in accordance with the invention.

The same references in different Figures refer to the same elements performing the same function.

FIG. 1 shows a prior art buck converter. A series arrangement of the resistor R1 and the controllable switches CF and SF is arranged to receive a DC input voltage VDC. A junction of the switches CF and SF is connected via an inductor L to a load RL. A smoothing capacitor CL is arranged in parallel with the load RL. A control circuit CC controls the switches CF and SF with the switching signal VC1 and VC2 respectively. The voltage across the inductor L is denoted by VL, and the current through the inductor L is denoted by IL. The voltage at the junction of the switches CF and SF is VS, and the voltage across the load RL is VP. The operation of the buck converter is elucidated with respect to the waveforms shown in FIG. 2.

FIGS. 2A-2C show waveforms for elucidating the operation of the prior art buck converter in a continuous mode. FIG. 2A shows the current IL through the inductor L, FIG. 2B shows the control voltage VC1 which controls the switch CF, and FIG. 2C shows the voltage VSE measured across the resistor R1. The switch CF is closed when the control voltage VC1 has a high level. The control voltage VC2 which controls the switch SF is the control voltage VC1 inverted in polarity.

Figure 3:
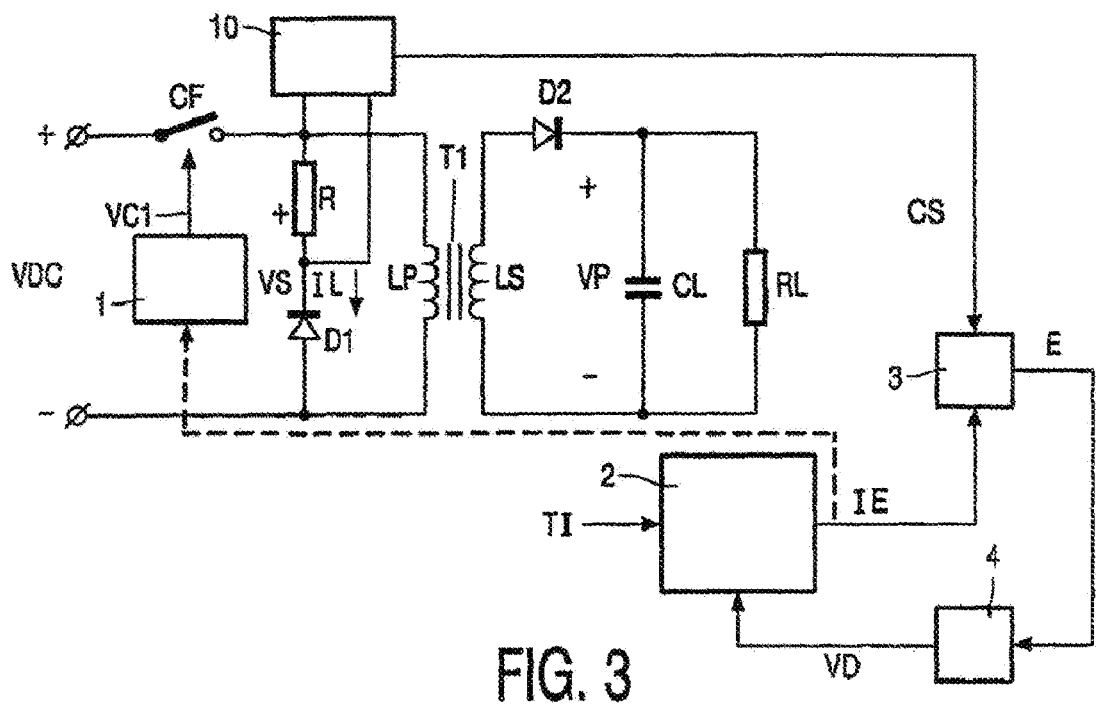
FIG. 3 shows an embodiment of a power converter in accordance with the invention.

At instant t1, the switch SF opens and the switch CF closes. The voltage VL across the inductor L becomes equal to the fixed value VDC-VP and the current IL through the inductor L linearly increases. The controller CC should open the switch CF and close the switch SF when the current IL through the inductor L crosses a reference level IREF at instant t2 to stabilize the output voltage VP. Now the fixed voltage VP is present across the inductor L, and the current IL through the inductor L linearly decreases until the instant t3. Actually, the switch SF should be closed a small time later than the instant t2 at which the switch CF is opened.

However, the controller CC does not have a direct and undisturbed representation of the current IL through the inductor L available. The controller CC determines the switch-off instant of the switch CF by determining when the voltage measured across the resistor R1 crosses a reference level VREF. At the instant t1 the switch CF is closed and a current starts flowing through the resistor R1 and the voltage VSE starts increasing. Due to parasitic effects it takes some time until the voltage VSE is a good representation of the current IL. The parasitic effects are, for example, caused by a parasitic capacitance at the junction between the switches CF and SF, an inductance of the track from the positive pole of the DC-voltage VDC to this junction, and a parasitic capacitance at this positive pole. If the on-period of the switch CF is short, the parasitic effects may still be present at the instant t2. Consequently, the parasitic effects will influence the switch-off instant of the switch CF and disturb the stabilization of the output voltage VP.

At instant t3 the next repetition or switching period T starts. The duty cycle δ of the control voltage VC1 is defined as δ=(t2−t1)/T or δ=VP/VDC.

The current IL may be measured as the voltage across a resistor R which is arranged in series with the inductor L or with the switch CF. As the buck converter is controlled to stabilize its output voltage VP by the instant t3 at which the measured current crosses a reference level IREF, it is important that this instant is not varying with disturbances on the real or measured current around the reference level IREF. The disturbances may be due to parasitic effects or may not be settled in time. These disturbances have an especially large influence when the duty cycle δ (the on time of the switch CF) is small.

An aspect of the invention is directed to emulate the current IL in the inductor L and to use the emulated current IE (which does not show the disturbances) to switch off the switch CF. In a preferred embodiment in accordance with the invention, the current IL through the inductor L is measured during the much longer on-time of the switch SF. The longer time allows the parasitic effects to be settled before the measured current is used to generate the emulated current IE. In this embodiment, the current may be measured over a resistor R (see FIG. 3) in series with the main current path of the switch SF, or by a sense FET which generates a (scaled) copy of the current through the switch SF. A diode D1 may be used instead of the switch SF.

FIG. 3 shows an embodiment of a power converter in accordance with the invention. The converter comprises a series arrangement of a switch CF, a resistor R and a rectifier D1 coupled to receive a DC input voltage VDC which may be a rectified mains voltage. The inductor LP is arranged across the series arrangement of the resistor R and the rectifier D1, and is the primary winding of a transformer T1 which has a secondary winding LS. The secondary winding LS supplies an output voltage VP to the parallel arrangement of the load RL and a smoothing capacitor CL via a rectifier D2. The switch controller 1 controls the switch CF to switch on and off with a repetition period T and a duty cycle δ. The rectifier D1 conducts the current IL when the switch CF is non-conductive.

A circuit 10 measures the current through the rectifier D1 and generates a current signal CS which is representative for the current IL through the primary winding LP. The current signal CS is the voltage across the resistor R. In principle, it is also possible to measure the current through the switch CF or the current through the primary winding LP. In these situations, the resistor should be arranged in series with the switch CF or the primary winding LP. However, if the duty cycle δ is short and/or the disturbances in the current during the on-time of the switch CF are present during the whole on-time of the switch CF, it might be impossible to find a part of the measured current which can be used to be compared with the emulated signal IE to generate the emulated signal IE which resembles the actual current IL through the primary winding LP sufficiently accurate. It is also possible to use a FET to measure the current. The generator 2 receives timing information TI and a control signal VD and supplies the emulated signal IE. The comparator 3 compares the emulated signal IE with the current signal CS and supplies an error signal E. The error signal E is processed by the generator controller 4 to generate the control signal VD.

The timing information TI comprises information required to be able to generate the emulated signal IE resembling the current signal CS as much as possible. The control signal VD controls a property of the emulated signal IE, for example the amplitude or the DC level. For example, in a buck converter, the current through the primary winding LP is a substantially sawtooth signal. The emulated signal IE may be obtained by integrating a square wave signal which has the same duty cycle δ and repetition period T as the current IL. The square wave signal may be the switching signal VC1 of the switch CF, or the voltage VS. It is also possible to directly generate the sawtooth signal based on the repetition period T and the duty cycle δ. Thus, the timing information TI comprises the information to be able to generate the square wave signal or the sawtooth signal, or the timing information TI is the square wave signal.

The comparator 3 may subtract the emulated signal IE from the current signal CS.

The generator 2, the comparator 3, and the generator controller 4 form a closed loop emulator circuit for generating an emulated signal IE which resembles the current signal CS as much as possible in at least one property.

In the embodiment in accordance with the invention as shown in FIG. 3, a transformer T1 is used and the power converter operates in a discontinuous mode. In a preferred embodiment, the transformer is replaced by an inductor as shown in FIG. 1 and the converter operates in a continuous mode. The diode D1 is preferably a controllable switch as shown in FIG. 1.

Figure 4:
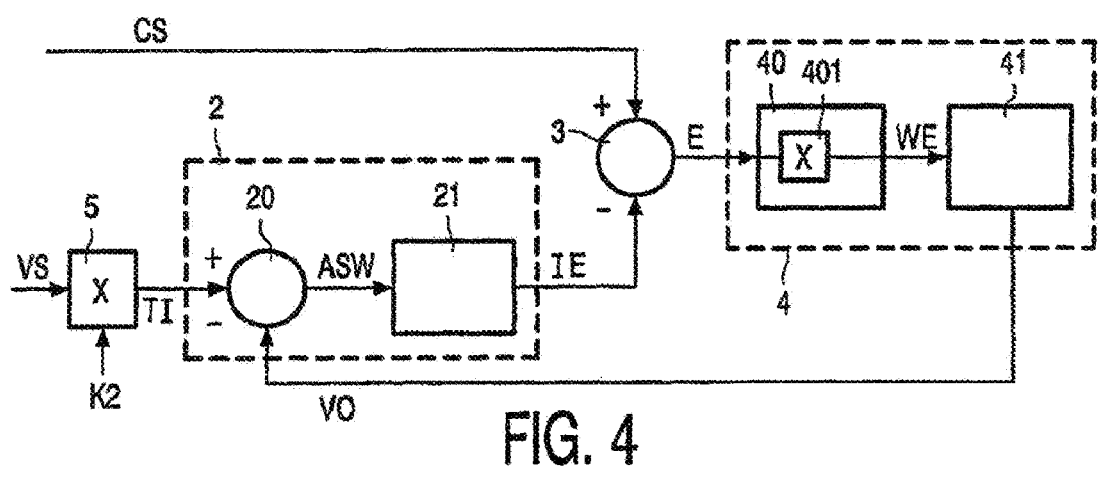
FIG. 4 shows an embodiment of an emulator circuit.

FIG. 4 shows an embodiment of an emulator circuit. A circuit 5 multiplies the square wave voltage VS with a constant factor K2 to supply the timing information TI as a square wave voltage TI. Usually, the multiplication is a tapping-in (as the factor is smaller than 1) to obtain a square wave voltage TI with a much lower amplitude than the amplitude of the voltage VS. The generator 2 comprises a subtractor 20 and an integrator 21. The subtractor 20 subtracts the DC control signal VO (the signal VD in FIG. 3) from the square wave voltage TI to obtain a DC-level adapted square wave signal ASW. The integrator 21 integrates the adapted square wave signal ASW to supply the emulated signal IE. The comparator 3 compares the emulated signal IE with the current signal CS to supply the error signal E which indicates the difference between the current signal CS and the emulated signal EE.

The generator controller 4 comprises a timing circuit 40 which generates a window in time and a filter 41 which receives the windowed error signal WE and supplies the control signal VO. The timing circuit 40 comprises a circuit 401 which multiplies the error signal E with zero outside the window and with a non-zero constant inside the window. In this manner, the timing circuit 40 generates a window in time during which the error signal E is relevant for the control signal VO. Consequently, the error signal E outside the window has no influence on the control loop. It is also possible to compare the current signal CS with the emulated signal IE during the window only, such that the error signal E is zero outside the window.

FIGS. 5A-5C show waveforms for elucidating the embodiment of the emulator circuit shown in FIG. 4. FIG. 5A shows the emulated signal IE, FIG. 5B shows the current signal CS, and FIG. 5C shows the error signal E. A non-stable situation is shown in which the control signal VO is a DC voltage with a relatively low value. The emulated signal IE is the integral of the difference of the square wave shaped signal IT and the DC level VO. The DC level VO gives rise to a linear increasing component VO' in the emulated signal IE. The square wave signal IT causes the sawtooth shaped waveform. The emulated signal IE is the superposition of the sawtooth shaped waveform and the component VO'.

At instant t10, the switch CF is closed, and the current IL through the primary winding LP starts increasing linearly. If the resistor R1 shown in FIG. 3 is used, the current signal CS is zero during this period. If the current in the primary were measured, the current signal CS were a linearly increasing waveform. At the instant t11, the switch CF is opened, the diode D1 (in FIG. 3, or the switch SF in FIG. 1) starts conducting, and the current IL in the primary winding LP starts decreasing in a linear way, which is reflected by the linearly decreasing current signal CS. The overshoot due to the parasitic effects is shown. This cycle repeats every period T: at instants t14 and t18, the switch CF is closed again, and at the instants t15 and t19 the switch CF is opened again. In the first period T shown, the window W1 starts at the instant t12 and lasts until the instant t13, in the next period, the window W1' starts at the instant t16 and lasts until the instant t17. Within the windows W1 and W1', the error signal E is the difference of the current signal CS and the emulated signal IE. Outside the windows W1 and W1', the error signal E is not relevant for the determination of the control signal VO.

The control signal VO is controlled based on the error signal E such that the emulated signal IE becomes as much equal as possible as the current signal CS within the windows W1 and W1'. In the embodiment of the emulator circuit shown in FIG. 4, the control signal is a substantially DC level which is obtained by filtering the error signal E by the filter 41 during the window W1, W1' generated by the timing circuit 40. The timing circuit 40 is not essential to the invention. The disturbances on the emulated signal IE will be less than on the measured current signal CS due to the filter 41 only. However, preferably, the timing circuit 40 produces a window in time W1, W1' which is selected to compare the emulated signal IE with the current signal CS during a period in time the current signal CS is not disturbed.

The controlling effect of the control voltage VO is not shown in FIG. 5A. At the instant t13 the error signal E as determined during the window W1 is available. The large positive value of the error signal E indicates that the value of the emulated signal IE is too low. Consequently, the DC level of the control voltage VO should be lowered such that the DC component of the adapted square wave voltage ASW increases and thus the emulated signal IE increases faster than shown in FIG. 5A. At the correct DC value of the control voltage VO, during the window, the emulated signal IE is equal to the current signal CS, and the error signal E is zero.

The window W1, W1' should be selected such that the disturbances due to the parasitic effects are outside the window W1, W1'. At low loads (high values of RL), the current IL may become negative within the period between t11 and t14. In such power converters the diode D1 should be a controllable switch SF which is able to conduct current in two directions, such as a MOSFET. Preferably, the window W1, W1' selected as near as possible to the instant t11 if the current sensing is not able to detect negative currents.

Figure 6:
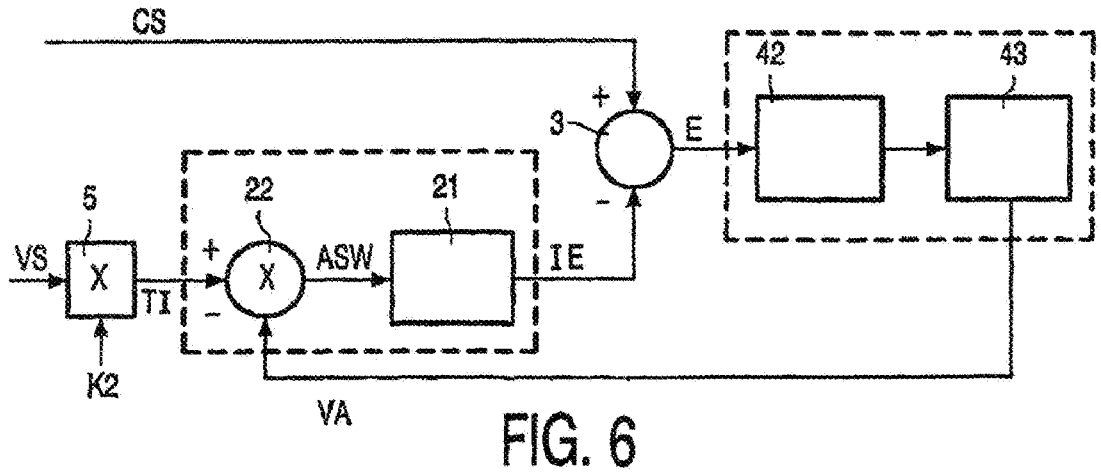
FIG. 6 shows an embodiment of another emulator circuit.

FIG. 6 shows an embodiment of another emulator circuit. A circuit 5 multiplies the square wave voltage VS with a constant factor K2 to supply the timing information TI as a scaled square wave voltage TI. Usually, the multiplication is a tapping-in to obtain a square wave voltage TI with much lower amplitude than the amplitude of the voltage VS. The generator 2 comprises a multiplier 22 and an integrator 21. The multiplier 22 multiplies the DC control signal VA (the signal VD in FIG. 3) with the square wave voltage TI to obtain an amplitude adapted square wave signal ASW. The integrator 21 integrates the adapted square wave signal ASW to supply the emulated signal IE. The comparator 3 compares the emulated signal IE with the current signal CS to supply an error signal E indicating the difference between the current signal CS and the emulated signal IE.

The generator controller 4 comprises a timing circuit 42 which generates a window in time and a filter 43 which receives the windowed error signal WE and supplies the control signal VA. In this manner, the timing circuit 40 generates a window in time during which the error signal E is relevant for the control signal VA. It is also possible to compare the current signal CS with the emulated signal IE during the window only, such that the error signal E is zero outside the window.

FIGS. 7A and 7B show waveforms for elucidating the embodiment of the emulator circuit shown in FIG. 6. FIG. 7A shows the emulated signal IE as a dashed sawtooth waveform, and the current signal CS as the solid line. Only the relevant part of the current signal CS is shown. FIG. 7B shows the error signal E. The error signal E is relevant during the window in time W2 only. The error signal E is not zero as long as the amplitudes of the emulated signal IE and the current signal CS are not equal. A non-zero error signal E will be filtered by the filter 43 to obtain a substantially DC-level control voltage VA. If the amplitude of the emulated signal IE is larger than the amplitude of the current signal CS, the error signal E will lower the DC-level of the control voltage VA. Consequently, the square wave signal IE will be multiplied with a smaller constant and thus the amplitude of the emulated signal IE will become smaller. The stable situation is reached when the emulated signal E and the current signal CS are equal within the window W2 and the error signal E is zero.

Figure 8:
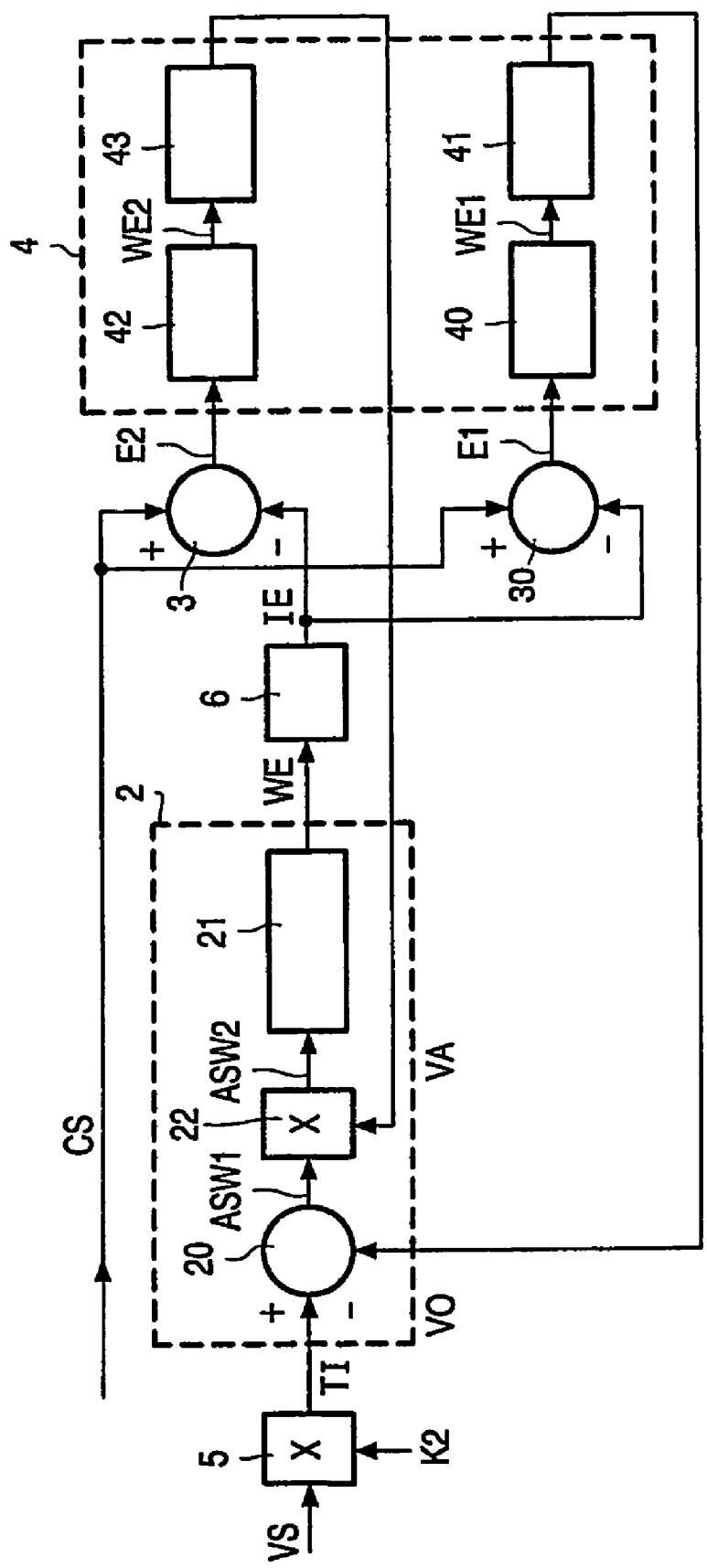
FIG. 8 shows an embodiment of another emulator circuit.

FIG. 8 shows an embodiment of another emulator circuit. The embodiment shown in FIG. 8 is a combination of the embodiments shown in FIGS. 4 and 6. Both the feedback loop which takes care of the correct DC level of the emulated signal IE and the feedback loop which takes care of the correct amplitude of the emulated signal IE are present.

The emulator circuit comprises a circuit 5 which multiplies the square wave voltage VS with a constant factor K2 to supply the timing information TI as a square wave voltage TI. Usually, the multiplication is a tapping-in to obtain a square wave voltage TI with much lower amplitude than the amplitude of the voltage VS.

The generator 2 comprises a subtractor 20, a multiplier 22, and an integrator 21. The subtractor 20 subtracts the DC control signal VO from the square wave voltage TI to obtain a DC-level adapted square wave signal ASW1. The multiplier 22 multiplies the DC-control signal VA with the adapted square wave voltage ASW1 to obtain an amplitude adapted square wave signal ASW2. The integrator 21 integrates the adapted square wave signal ASW2 to supply an integrated signal VE. The emulator circuit further comprises a voltage to current converter 6 which multiplies the integrated signal VE which is representative for a voltage with a constant factor to obtain the emulated signal IE being representative for a current. The in this way generated emulated signal IE can be directly compared with the current signal CS which is representative for the current in the primary winding LP. The current converter 6 is not required if the current signal CS is scaled properly to represent a voltage comparable with the integrated signal VE.

The comparator 3 compares the emulated signal IE with the current signal CS to supply an error signal E2 indicating the difference between the current signal CS and the emulated signal IE. The comparator 30 compares the emulated signal IE with the current signal CS to supply an error signal E1 indicating the difference between the current signal CS and the emulated signal IE. It is possible to use one comparator instead of the two comparators 3 and 30. If one comparator is used, both feedback loops use the same error signal.

The generator controller 4 comprises a timing circuit 40 which generates a window in time W1, a filter 41 which receives the windowed error signal WE1 and supplies the control signal VO, a timing circuit 42 which generates a window in time W2, and a filter 43 which receives the windowed error signal WE2 and supplies the control signal VA.

Although, in a continuous mode power supply, the presence of a DC-feedback loop alone is sufficient to generate the emulated signal IE being a good representation of the current IL through the inductor L, the amplitude-feedback loop has the advantage that the tolerances of the values of the components in the loop will be automatically compensated. In a discontinuous mode power supply the DC level is not an issue, and the amplitude feedback loop alone suffices to generate the emulated signal IE.

Although two comparators 3, 30, two window generators 40, 42 and two filters 41, 43 are shown, it is possible to use the same comparator for both the DC-loop and the amplitude loop. It is also possible to use the same window generator and filter for both loops. However, using separate windows 40, 42 and separate filters 41, 43 allows a better performance of the loops.

The best choice for window 40 would be symmetrically around the crossing point TCR of the emulated signal E and the current signal CS, such that a DC-offset has the lowest influence on the control of the loop. The best choice of the window 42 would be as far away as possible from the crossing point TCR to get the biggest influence of the amplitude difference between the emulated signal IE and the current signal CS.

However, when the crossing point TCR is not extrapolated in advance, the window may start when the crossing point TCR is detected and may have a fixed duration.

Figure 9:
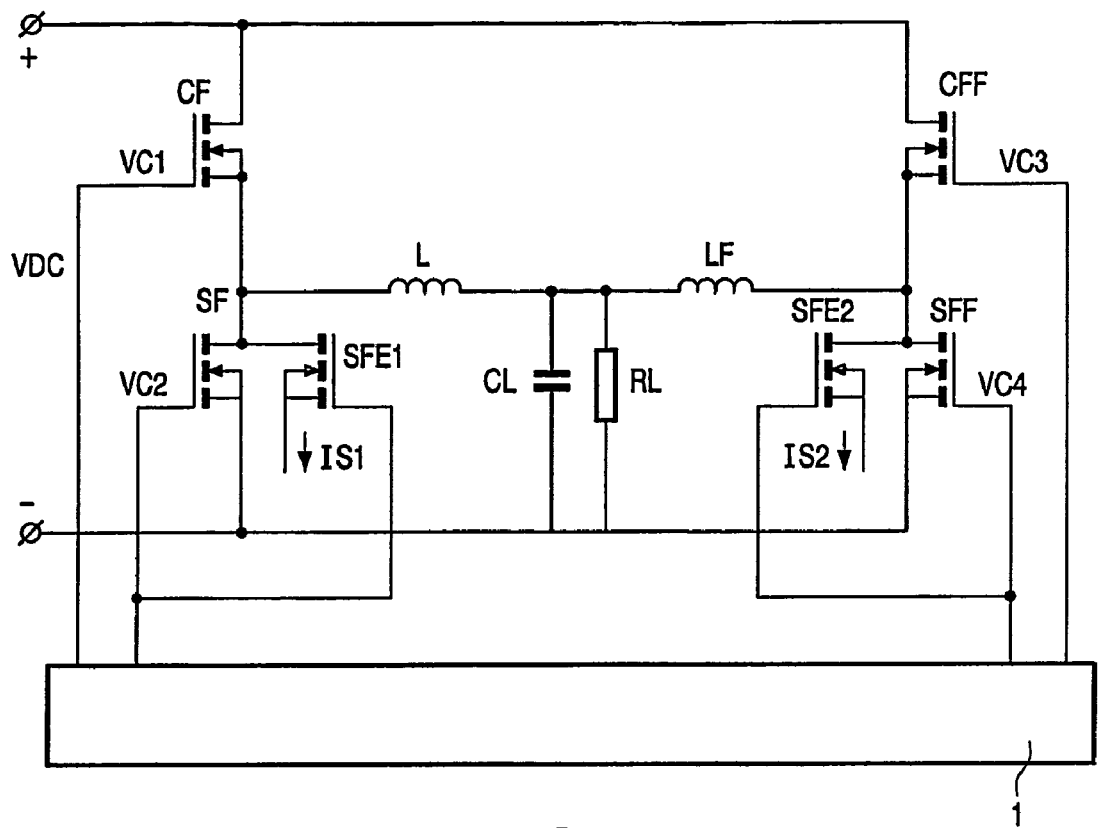
FIG. 9 shows an embodiment of a multi-phase buck-converter.
Figure 10A:
FIGS. 10-10D show voltage waveforms for elucidating the operation of the multi-phase buck-converter shown in FIG. 9.
Figure 10B:
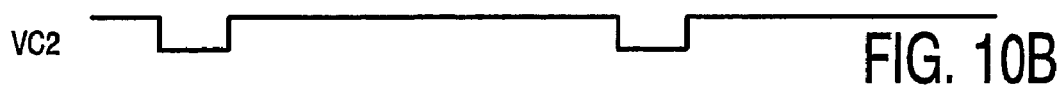
Figure 10C:
Figure 10D:

FIG. 9 shows an embodiment of a multi-phase buck-converter. The first buck-converter comprises the FETs CF, SF and SFE1, and the inductor L. The FETs CF and SF are arranged in series to receive the input DC-voltage VDC. The junction of the FETs CF and SF is coupled to the load RL via an inductor L. The FET SFE1 is arranged to supply a sense current IS1 which is a measure for the current in the drain-source path of the FET SF.

The second buck-converter comprises the FETs CFF, SFF and SFE2, and the inductor LF. The FETs CF and SF are arranged in series to receive the input DC-voltage VDC. The junction of the FETs CF and SF is coupled to the load RL via an inductor LF. The FET SFE2 is arranged to supply a sense current IS2 which is a measure for the current in the drain-source path of the FET SFF.

A smoothing capacitor CL is arranged in parallel with the load RL.

The a switch controller 1 supplies periodic switching signals VC1, VC2, VC3, VC4 to the FETs CF, SF, CFF, SFF respectively. The FETs SFE1 and SFE2 are controlled by the switching signals VC2 and VC4, respectively.

FIG. 10A-10D show voltage waveforms for elucidating the operation of the multi-phase buck-converter shown in FIG. 9. FIGS. 10A, 10B, 10C, 10D show the switching signals VC1, VC2, VC3, VC4, respectively. All the switching signals have a repetition time (T) and a duty cycle (δ). The switching signals VC3 and VC4 are shifted in phase with respect to the switching signals VC1 and VC2. Consequently, the on-times of the switches CF and CFF differ and the ripple on load RL will decrease.

FIG. 11 shows an electronic apparatus comprising an embodiment of a power converter in accordance with the invention. By way of example, the electronic apparatus is elucidated as being a display apparatus such as a television receiver or a computer monitor. However the power converter in accordance with the invention can be used in other electronic apparatuses, such as audio apparatuses, computers, or mobile telephones.

The signal processing circuit 100 receives an input video signal IV and supplies a display video signal DV to a display device 101. The display device may e.g. be a cathode ray tube or a matrix display. The power converter 103 in accordance with the invention receives a DC-input voltage VDC from a rectifier 102 and supplies the output voltage VP to the display device 101. The rectifier 102 rectifies the main voltage MV. If the electronic apparatus is battery powered, the rectifier 102 is not required and the battery supplies the DC-input voltage VDC.

It should be noted that the above-mentioned embodiments illustrate rather than limit the invention, and that those skilled in the art will be able to design many alternative embodiments without departing from the scope of the appended claims.

Instead of the switch CF and the diode D1 in FIG. 3 it is possible to use the two switches CF and SF shown in FIG. 1.

The power converter may operate in a continuous mode or in a discontinuous mode. A discontinuous mode has the advantage that the minimum power can be decreased which is attractive in portable applications.

In a continuous mode power converter, the DC-level loop is required to prevent drifting away of the emulated signal IE when the amplitude is not exactly equal to the amplitude of the current signal CS. In a discontinuous power converter, the DC-level loop is of less value as the current IL is limited to a defined value near zero every cycle, and it is not possible that a DC term drifts away. But still, in a discontinuous mode power converter the DC-level loop may be used to improve the accuracy of the emulated signal IE. In a discontinuous mode power converter, the integrator has to be reset every cycle to reset the emulated signal IE to zero when both the switches CF and SF (FIG. 1) are off.

The DC-level loop may be replaced by a fixed input signal if an error is accepted in the amplitude of the emulated current IE and the current signal CS.

In the embodiments in accordance with the invention described above, the measured current (represented by the current signal CS) is compared with an emulated signal IE. Both the current signal CS and the emulated signal EE may be either a current or a voltage representing a current.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A power converter comprising
an inductor and a controllable switch coupled to the inductor,
a switch controller for supplying a periodic switching signal with a repetition time and a duty cycle to the controllable switch to generate a periodical inductor current through the inductor,
a generator for generating an emulated signal based on timing information representing the repetition time and the duty cycle to emulate a current signal being representative of the inductor current,
a comparator for comparing the emulated signal with the current signal to obtain an error signal, and
a generator controller for receiving the error signal to supply a control signal to the generator for adapting a property of the emulated signal to become substantially equal to a property of the current signal.

2. A power converter as claimed in claim 1, wherein the power converter further comprises means for supplying the timing information comprising a square wave signal having the repetition time and the duty cycle, and the generator comprises
means for receiving the control signal to adapt a DC-level or an amplitude of the square wave signal for supplying an adapted square wave signal, and
an integrator for integrating the adapted square wave signal to supply the emulated signal.

3. A power converter as claimed in claim 1, wherein the generator controller comprises a filter for low pass filtering the error signal to obtain a filtered error signal being supplied to the generator controller.

4. A power converter as claimed in claim 1, wherein the generator controller comprises timing means for generating a window in time being shorter than the repetition time to control the generator with the error signal during the window only.

5. A power converter as claimed in claim 4, wherein the timing means comprise an error signal multiplier for multiplying the error signal with zero outside the window and with a non-zero constant inside the window.

6. A power converter as claimed in claim 1, wherein the generator controller comprises timing means for generating a window in time being shorter than the repetition time to control the comparator to be active during the window only.

7. A power converter as claimed in claim 2, wherein the means for adapting a DC-level or an amplitude of the square wave signal comprise an adder for adding a DC-level to the square wave signal.

8. A power converter as claimed in claim 2, wherein the means for adapting a DC-level or an amplitude of the square wave signal comprise a multiplier for multiplying the square wave signal with a DC-level.

9. A power converter as claimed in claim 1, wherein the power converter further comprises means for supplying the timing information comprising a square wave signal having the repetition time and the duty cycle, and the generator comprises an adder for adding a DC-level to the square wave signal, and a multiplier for multiplying the square wave signal with a DC-level to obtain an adapted square wave signal, and an integrator for integrating the adapted square wave signal to obtain the emulated signal, the comparator being arranged for comparing the emulated signal with the current signal to obtain a first error signal, the power converter further comprises a further comparator for comparing the emulated signal with the current signal to obtain a second error signal, the generator controller comprising first timing means for generating a first window in time, second timing means for generating a second window in time, both the first and the second window being shorter than the repetition time, a first filter for filtering the first error signal during the first window only, to supply a first filtered error signal to the adder, and a second filter for filtering the second error signal during the second window only, to supply a second filtered error signal to the multiplier.

10. A power converter as claimed in claim 1, further comprising a current measuring element being arranged to measure a current through the inductor during a period in time when the controllable switch is non-conductive.

11. A power converter as claimed in claim 1, wherein the power converter comprises a buck converter and the switch controller is adapted to control the buck converter in a continuous mode.

12. A multi-phase buck-converter comprising a power converter as claimed in claim 1, the controllable switch and the inductor being arranged in series between a DC-input voltage and a load, the multi-phase buck-converter further comprises a series arrangement of a further controllable switch and a further inductor, the series arrangement being arranged between the DC-input voltage and the load, the switch controller being adapted for supplying a further periodic switching signal to the further controllable switch, the first mentioned switching signal and the further switching signal having time shifted slopes.

* * * * *